(12) United States Patent
Fournier

(10) Patent No.: US 7,984,688 B2
(45) Date of Patent: Jul. 26, 2011

(54) PIVOTING POINTER DISPLAY DEVICE

(75) Inventor: Joël Fournier, Cergy (FR)

(73) Assignee: Johnson Controls Technology Company, Holland, MI (US)

( * ) Notice: Subject to any disclaimer, the term of this patent is extended or adjusted under 35 U.S.C. 154(b) by 930 days.

(21) Appl. No.: 11/837,406

(22) Filed: Aug. 10, 2007

(65) Prior Publication Data

US 2007/0273647 A1    Nov. 29, 2007

Related U.S. Application Data

(63) Continuation of application No. PCT/FR2006/000185, filed on Jan. 27, 2006.

(30) Foreign Application Priority Data

Feb. 11, 2005    (FR) ..................................... 05 01385

(51) Int. Cl.
 *G01D 13/28*    (2006.01)
(52) U.S. Cl. ........................ 116/288; 116/62.1; 362/23
(58) Field of Classification Search .......... 116/286–288, 116/62.1, DIG. 36, 284, 303; 362/23, 26; 174/254
See application file for complete search history.

(56) References Cited

U.S. PATENT DOCUMENTS

| | | | | |
|---|---|---|---|---|
| 3,300,572 A | * | 1/1967 | Dahlgren et al. | 174/69 |
| 3,580,085 A | * | 5/1971 | Hitzelberger | 73/496 |
| 3,677,619 A | * | 7/1972 | Mackenzie | 359/436 |
| 3,909,670 A | * | 9/1975 | Wakamatsu et al. | 315/276 |
| 5,050,045 A | * | 9/1991 | Kato et al. | 362/23 |
| 5,372,087 A | * | 12/1994 | Kato et al. | 116/288 |
| 5,631,448 A | * | 5/1997 | Rabinowitz et al. | 177/177 |
| 5,747,743 A | * | 5/1998 | Kato et al. | 174/254 |
| 5,806,954 A | * | 9/1998 | Butt et al. | 362/26 |
| 6,314,908 B1 | * | 11/2001 | Olbrich et al. | 116/288 |
| 6,408,783 B1 | | 6/2002 | Ludewig | |
| 6,606,961 B1 | * | 8/2003 | Noll et al. | 116/288 |
| 7,681,517 B2 | * | 3/2010 | Ritthaler et al. | 116/288 |

FOREIGN PATENT DOCUMENTS

| | | |
|---|---|---|
| DE | 195 37 346 A1 | 4/1996 |
| EP | 0 811 827 A | 12/1997 |
| FR | 2 726 363 A | 5/1996 |

* cited by examiner

*Primary Examiner* — R. A. Smith
*Assistant Examiner* — Tania C Courson
(74) *Attorney, Agent, or Firm* — Foley & Lardner LLP

(57) ABSTRACT

A display device includes a first portion of a flexible ribbon, the first portion secured along the pointer and a bend portion of the flexible ribbon disposed between the first portion of the flexible ribbon and a first loop branch, the bend portion folded over one end of the pointer so that the bend portion and the first loop branch connected to the pointer both extend along a common plane.

21 Claims, 1 Drawing Sheet

PIVOTING POINTER DISPLAY DEVICE

CROSS-REFERENCE TO RELATED PATENT APPLICATIONS

The present application is a Continuation of International Application No. PCT/FR2006/000185 filed Jan. 27, 2006, which claims the benefit of French Priority Application No. FR 0501385 filed Feb. 11, 2005. The disclosures of International Application PCT/FR2006/000185 and French Priority Application No. DE 0501385 are incorporated herein by reference in their entirety.

BACKGROUND

The present invention relates generally to the field of pivoting pointer display devices.

Display devices are known that include a pointer of orientation that is variable in pivoting about an axis, the pointer carrying a lighting member that is connected to a connector by a flexible ribbon secured along the pointer.

In order to provide a flexible connection between the portion of the ribbon secured to the pointer and the stationary connector, document DE 195 37 346 discloses winding the ribbon under the pointer in a spiral about the pivot axis. The design of DE 195 37 346 requires sufficient space to be provided under the pointer, which space needs to be much wider than the ribbon in order to ensure the ribbon does not rub against the pointer during deformations of the ribbon as induced by the twisting that results from the spiral mount. The design of DE 195 37 346 therefore implies large total thickness for the display device. In addition, the ribbon of DE 195 37 346 is folded over the side of the pointer, and as a result, the ribbon applies an opposing force on the pointer that depends on the orientation of the pointer.

Document EP 0 811 827 discloses a technique for making a display device in which the connection ribbon is folded in half so as to form a loop with one branch connected to the pointer and another branch connected to the connector. In the configuration of EP 0 811 827, the flexible ribbon is secured to the hub of the pointer so that the lighting member of the pointer must necessarily be integrated in the hub.

SUMMARY

One embodiment relates to a display device having a pointer of orientation that is variable by pivoting about an axis. The pointer carries a lighting member connected to a connector by a flexible ribbon looped to have a first loop branch connected to the pointer and a second loop branch connected to the connector. The device further includes a first portion of the flexible ribbon, the first portion secured along the pointer. The device yet further includes a bend portion of the flexible ribbon disposed between the first portion of the flexible ribbon and the first loop branch, the bend portion folded over one end of the pointer so that the bend portion and the first loop branch connected to the pointer both extend along a common plane.

There is further provided a display device having a pointer of orientation that is variable in pivoting about an axis, the pointer carrying a lighting member that is connected to a connector. A ribbon forms the connection between the lighting member and the connector, the ribbon secured along the pointer and forming a bend portion folded over one end of the pointer, the ribbon forming a loop with a branch connected to the pointer. The bend portion and the branch connected to the pointer extend in a common plane.

There is also provided a display device having a pointer of orientation that is variable in pivoting about an axis, the pointer carrying a lighting member that is connected to a connector. A ribbon connected to the pointer and the connector forms a loop with a first loop branch connected to the pointer via a bend portion that is held to the end of the pointer so that the bend portion extends in the same plane as the first loop branch.

There is yet further provided a ribbon for a display device. The display device includes a pointer of orientation that is variable in pivoting about an axis. The pointer carries a lighting member that is connected to a connector. The ribbon includes a first end connected to the connector and a bend portion held to the end of the pointer pivoting about the axis. The ribbon further includes a loop formed between the first end and the bend portion, the loop forming a first branch, a curved portion, and a second branch. The first branch, the curved portion, the second branch, and the bend portion extend parallel to the axis of the pointer so that during movements of the pointer, the loop unwinds while maintaining its parallel orientation relative to the axis.

BRIEF DESCRIPTION OF THE DRAWINGS

Other characteristics and advantages of the application appear further on reading the following description with reference to the sole accompanying FIGURE (FIG. 1), which is a diagrammatic perspective view of a display device according to an exemplary embodiment.

DESCRIPTION

Figure 1:
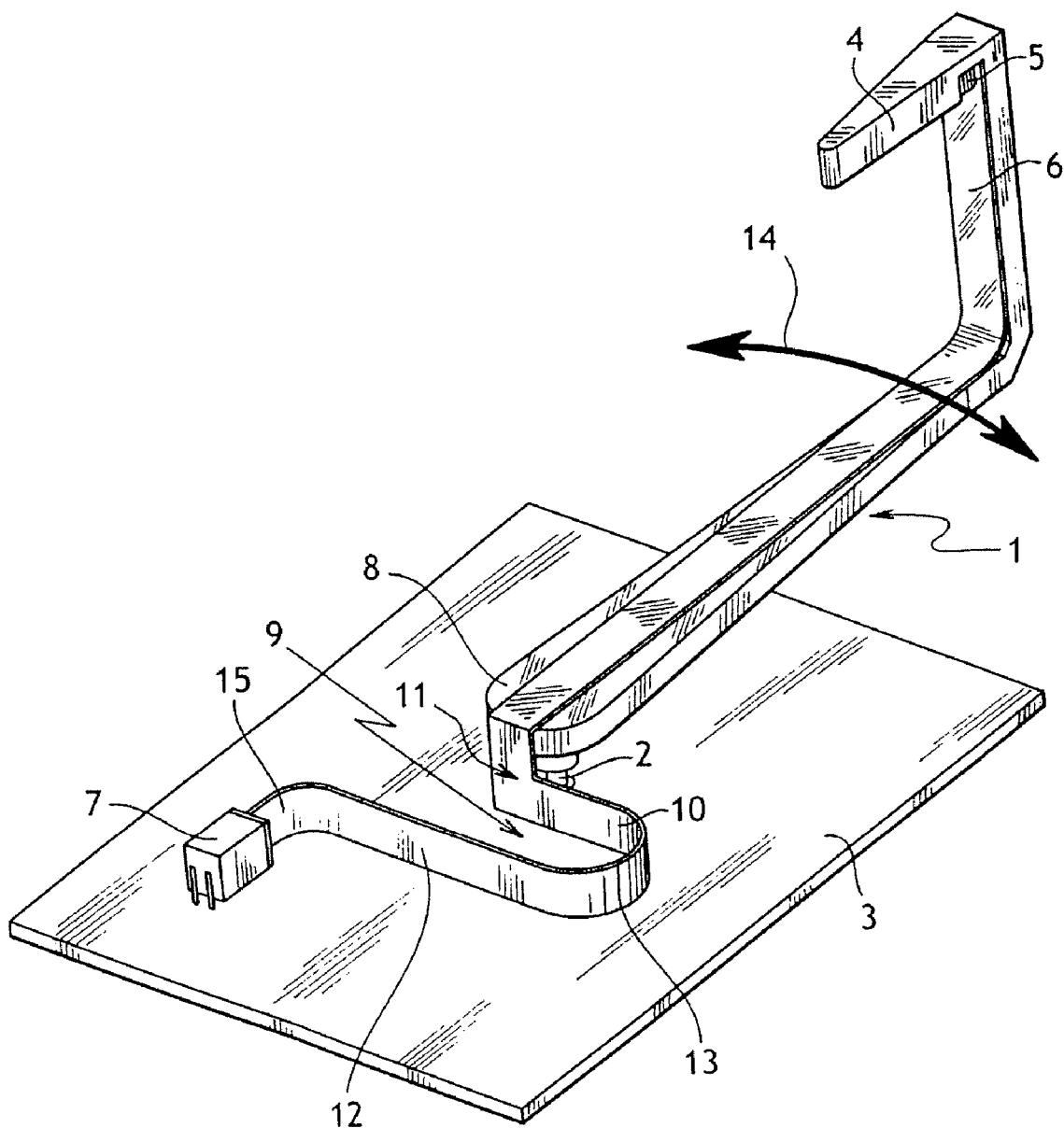

This disclosure presents a pivoting pointer display device capable of being made to occupy a small amount of thickness while providing freedom in the positioning of the lighting member. Such a display device may include a pointer of orientation that is variable by pivoting about an axis. The pointer may carry a lighting member connected to a connector by a flexible ribbon folded in half to form a loop. The loop may have one branch connected to the pointer and one branch connected to the connector. The flexible ribbon may be secured along the pointer, presenting a bend portion folded down over one end of the pointer so that the bend portion and the branch connected to the pointer both extend in a common plane.

According to one exemplary embodiment, the connector is offset relative to the pointer so that the loop always extends on the same side of the pointer regardless of the orientation of the pointer.

With reference to FIG. 1, a display device is shown according to an exemplary embodiment. The display device includes a pointer 1 of orientation that can be varied by pivoting through an angular range of about 300° about a pin 2 extending perpendicularly to the pointer 1 in the vicinity of one end thereof and passing through an electronics card 3 carrying a drive motor.

At its free end, the pointer includes a tip 4 carrying a lighting member 5 such as a light-emitting diode (LED) connected to a power supply ribbon 6 that is secured along the pointer 1. The power supply ribbon 6 is connected to a power supply connector 7 carried by the electronics card 3.

According to the embodiment shown in FIG. 1, beyond the end 8 of the pointer 1 that is mounted to pivot about the pin 2, the ribbon 6 is folded in half to form a U-shaped loop 9 with one branch 10 connected to the pointer via an angled portion 11 that is held folded down by being bonded adhesively to the end of the pointer so that the bend portion 11 extends in the same plane as the branch 10. Opposite to the branch, the U-shaped loop 9 has a branch 12 that is connected to the connector 7 by being folded outwards around a curve 15 serving to hold the loop in a U-shape while the pointer is pivoting.

Referring still to FIG. 1, the bend portion 11 and the branches 10 and 12 of the U-shaped loop, and also the curved connection portion 13 of the U-shaped loop 9 extend parallel to the axis of the pivot pin 2 so that during movements of the pointer, the loop unwinds while maintaining its generator lines parallel to the pivot axis. During pivoting movements of the pointer 1 about the axis of pin 2, the U-shaped loop 9 thus deforms, thereby minimizing the torque it applies to the pointer 1.

As further shown in FIG. 1, the connector 7 is not only offset axially from the end 8 of the pointer 1 over a distance that is sufficient to implement the U-shaped loop 9 without excessive bending stress on the power supply ribbon, it is also offset laterally through a sufficient distance relative to the axis of the pivot pin 2 to enable the U-shaped loop 9 to extend always on the same side of the pointer 1 while opposing pivoting of the pointer with torque that is substantially constant regardless of the direction in which the pointer is pointing during its movements as represented by bold arrow 14.

Naturally, the invention is not limited to the embodiment described and variant embodiments can be applied thereto without going beyond the ambit of the invention as defined by the claims.

In particular, according to an alternative embodiment, although the loop 9 is shown in the form of a U-shaped loop with its branch 12 having one end folded outwards, it is possible to make a U-shaped loop with its outer branch not being folded or being folded inwards. By placing the connector 7 laterally relative to the end 8 of the pointer 1 in the position shown, it is also possible to form a loop constituting a portion of a circle, with the distance from the connector to the pivot axis of the pin 2 of the pointer being calculated so as to have a suitable radius of curvature for the loop formed by the ribbon to ensure that the opposing torque delivered by the loop is not excessive.

Although the bend 11 is described above as being folded down onto the end of the pointer and held by adhesive, it could be held in this position by any other means. For example, it could be slid under a tongue that is secured to the pointer.

What is claimed is:

1. A display device comprising:
    a pointer of orientation that is variable by pivoting about an axis and that carries a lighting member;
    a flexible ribbon that connects the lighting member to a connector, wherein the flexible ribbon comprises:
        a u-shaped loop providing a first loop branch connected to the pointer and a second loop branch connected to the connector, wherein the first loop branch is disposed between the axis of the pointer and the second loop branch;
        a first portion of the flexible ribbon, the first portion secured along the pointer; and
        a bend portion of the flexible ribbon disposed between the first portion of the flexible ribbon and the first loop branch, the bend portion folded over one end of the pointer so that the bend portion and the first loop branch connected to the pointer both extend along a common plane.

2. The display device of claim 1, wherein the first portion of the flexible ribbon secured along the pointer extends along a plane that is not common to the plane of the bend portion and the first loop branch.

3. The display device of claim 1, wherein the first portion of the flexible ribbon secured along the pointer extends along a plane that is perpendicular to the plane of the bend portion and the first loop branch.

4. The display device of claim 1, wherein the connector is offset relative to the pointer so that the looped flexible ribbon forms a loop that always extends on the same side of the pointer regardless of the orientation of the pointer.

5. The display device of claim 4, wherein the u-shaped loop is the only u-shaped loop in the ribbon and does not wind around the pivot axis of the pointer.

6. The display device of claim 5, wherein the flexible ribbon is folded in half to form the u-shaped loop and no portion of the flexible ribbon forms a spiral.

7. The display device of claim 5, wherein the second loop branch connected to the connector has one end folded outwards from the loop.

8. The display device of claim 7, wherein the connector is disposed at a distance from the axis that is sufficient to ensure that during pivoting of the pointer about the axis in either direction, a level of opposing torque applied to the connector remains substantially constant.

9. A display device having a pointer of orientation that is variable in pivoting about an axis, the pointer carrying a lighting member that is connected to a connector, the display device comprising:
    a ribbon that forms the connection between the lighting member and the connector, the ribbon secured along the pointer and forming a bend portion folded over one end of the pointer, the ribbon folded in half to form a u-shaped loop with a first branch connected to the pointer and a second branch connected to the lighting member, wherein the first branch is between the axis of the pointer and the second branch;
    wherein the bend portion and the branch connected to the pointer extend in a common plane.

10. The display device of claim 9, wherein the connector is offset relative to the pointer so that the curved portion of the u-shaped loop remains on one side of the pointer regardless of the orientation of the pointer.

11. A display device having a pointer of orientation that is variable in pivoting about an axis, the pointer carrying a lighting member that is connected to a connector, the display device comprising:
    a ribbon connected to the pointer and the connector, the ribbon forming a u-shaped loop with a first loop branch and a second loop branch, wherein the first loop branch is disposed between the axis of the pointer and the second loop branch, and wherein the first loop branch is connected to the pointer via a bend portion that is held to the end of the pointer so that the bend portion extends in the same plane as the first loop branch.

12. The display device of claim 11, wherein the second branch is connected to the connector by being folded outwards around a curve to hold the loop in the u-shape while the pointer is pivoting.

13. The display device of claim 12, wherein the connector is offset axially from the end of the pointer over a distance that is sufficient to implement the U-shaped loop without excessive bending stress on the ribbon.

14. The display device of claim 13, wherein the connector is offset laterally through a sufficient distance relative to the axis of the pointer to enable the U-shaped loop to extend always on the same side of the pointer.

15. The display device of claim 14, wherein the connector is offset laterally through a sufficient distance relative to the axis of the pointer to enable the U-shaped loop to oppose the pivoting of the pointer with a torque that is substantially constant regardless of the direction in which the pointer is pointing during its movements.

16. The display device of claim 11, wherein the connector is located laterally relative to the end of the pointer so that the loop forms a portion of a circle with the distance from the connector to the axis of the pointer having a suitable radius of curvature for the loop formed by the ribbon to ensure that the opposing torque delivered by the loop is not excessive.

17. The display device of claim 11, wherein the bend portion is held to the end of the pointer by a tongue that is secured to the pointer.

18. The display device of claim 11, wherein the u-shaped loop is offset from the pointer's pivot axis and the ribbon does not form a spiral about the pivot axis.

19. A ribbon for a display device, the display device having a pointer of orientation that is variable in pivoting about an axis, the pointer carrying a lighting member that is connected to a connector, the ribbon comprising:

a first end connected to the connector;
a bend portion held to the end of the pointer pivoting about the axis; and
a u-shaped loop formed between the first end and the bend portion, the u-shaped loop forming a first branch, a curved portion, and a second branch, wherein the first branch and the curved portion are between the axis of the pointer and the second branch;
wherein the first branch, the curved portion, the second branch, and the bend portion extend parallel to the axis of the pointer so that during movements of the pointer, the loop unwinds while maintaining its parallel orientation relative to the axis.

20. The ribbon of claim 19, further comprising:
a first portion secured along the length of the pointer, the first portion extending along at least one plane that is not parallel to the first branch, the curved portion, the second branch, and the bend portion.

21. The ribbon of claim 20, further comprising:
a second end connected to the lighting member and disposed between the first portion and the bend portion.

* * * * *